Nov. 14, 1972  SAKAE FUKUI ET AL  3,702,758
MAGNETIC CHIPS BARREL FINISHING AND PROCESS
FOR PRODUCING THE SAME
Filed Sept. 10, 1970  2 Sheets-Sheet 1

INVENTORS
SAKAE FUKUI
HISAMINE KOBAYASHI
BY
Wolfe, Hubbard, Voit & Osann
ATTYS.

3,702,758
MAGNETIC CHIPS FOR BARREL FINISHING AND PROCESS FOR PRODUCING THE SAME
Sakae Fukui, Tokyo, and Hisamine Kobayashi, Nagoya, Japan, assignors to TDK Electronics Co., Ltd., Tokyo, Japan
Continuation-in-part of application Ser. No. 733,146, May 29, 1968. This application Sept. 10, 1970, Ser. No. 71,220
Claims priority, application Japan, June 1, 1967, 42/34,462
Int. Cl. C08g 51/12
U.S. Cl. 51—298                 9 Claims

ABSTRACT OF THE DISCLOSURE

This invention relates to hardened magnetic chips for use in barrel-finishing of metal bodies formed by pressing or die-casting, and to a process for producing such chips. The disclosed magnetic chips are substantially in a granular form and have high magnetic and high abrasive properties, substantially comprising a powdery magnetic material, a medium selected from the group consisting of a metal compound aqueous solution and an acid denatured alumina, and a laminating hardening agent containing at least one selected from the group consisting of kaolin, clay, frit, lime and boric acid, said powdery magnetic material being coated wtih said laminating hardening agent through said medium.

---

This application is a continuation-in-part of our co-pending application No. 733,146, filed May 29, 1968, and now abandoned, entitled, Magnetic Chips For Barrel Finishing and Process For Producing the Same.

This invention relates to barrel-finishing magnetic chips having high magnetic and abrasive properties, which chips are hardened by coating a brittle magnetic oxide material with a tough lamination, and further to a process for producing such barrel-finishing magnetic chips as above.

The barrel-finishing operation has recently come to be very often utilized to finish such parts as cameras or the like formed by pressing or die-casting. The barrel-finishing process finishes such parts by putting them together with an abrasive formed into trigonal pyramids, spheres or ellipsoids in a rotary polygonal barrel and rotating the barrel for a long time. The abrasives so far used for such barrel-finishing are naturally produced abrasives having silica as a main ingredient, including natural stones, granite, limestone and natural emeries, abrasives having hardened aluminum as a main ingredient and synthetic abrasives such as plastics. All such abrasives are nonmagnetic. In a barrel-finishing process wherein small parts are abrasively finished under a freely moving pressure with comparatively fine particles or very small forms of an abrasive, the finishing operation will be very efficient, but, when the abrasive is nonmagnetic or when both the abrasive and the parts to be finished are non-magnetic, the accompanying operation of sorting and separating the small finished parts from the abrasive will require very much trouble, time and cost and has proven considerably difficult. Therefore, it is highly desirable to sort and separate particularly small finished parts from an abrasive by magnetizing the abrasive.

However, conventional magnetic materials have a disadvantage that, when they themselves are crushed into fine powders and are used as abrasives, they will leave abrasions on the parts to be treated, and thus, they cannot be used as abrasives as they are. Magnetic oxide materials, on the other hand, pose no problem of leaving abrasions on the parts to be treated, but are so brittle that they cannot be utilized as abrasives for a direct use. Further, even such a process as adding and sintering silica, general ceramics for grinding hones or resinous binder onto the magnetic oxide material is insufficient for obtaining a suitable abrasive, since such processed material will still be high in wear. In order that such binder as above will elevate the resistance to wear of the above product, it will be necessary to greatly reduce the magnetism and abrasiveness of the original magnetic oxide material. Thus, none of the above have been practicable solutions.

The present invention provides excellent barrel-finishing magnetic chips from which such conventional disadvantages as are mentioned above have been effectively eliminated, and a process for producing such chips.

A main object of the present invention is to provide hardened powdery and molded magnetic chips which are favorable in abrasive characteristics and with which the sorting operation of the finished parts from the chips can be easily performed.

Other objects and advantages of the invention will become apparent from the following detailed description and upon reference to the accompanying drawings, in which.

While the invention will be described in connection with certain preferred embodiments, it will be understood that it is not intended to limit the invention to these particular embodiments. On the contrary, it is intended to cover all alternatives, modifications and equivalent arrangements as may be included within the spirit and scope of the invention as defined by the appended claims.

Figure 1:
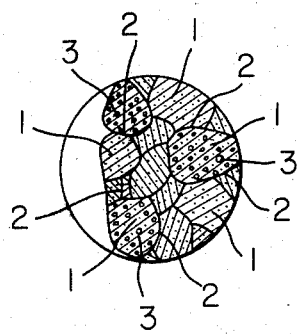
FIG. 1 shows a microscopic view of the structure of a ferrite material as a magnetic oxide material.

In FIG. 1 showing a microscopic structure of a ferrite material, 1 is a ferrite crystal grain, 2 is a crystal boundary and 3 is a void.

Such magnetic material as, for example, a ferrite is crushed to be in a determined grain diameter range with a wet mill, is levigated and is dehydrated in a drying furnace and a medium is mixed with it while being stirred in a dry mill so that the crushed fine powder grains of the magnetic material is painted to be uniformly wet on the entire surfaces with the medium. Then, while the crushed fine powder grains of the magnetic material thus painted with said medium are being stirred, the above mentioned medium and laminating hardening agent are mixed with them alternately little by little so that the crushed grains of the magnetic material may be coated on the surfaces with the laminating hardening agent through the medium and made into coated magnetic chip raw material. When they are put into a saggar and are roasted in an oxidizing atmosphere within a tunnel kiln, hardened granular magnetic chips will be obtained.

The roasting, or sintering, of the mixture results in the laminating agent being fused to the surface of the ferrite granules through the medium so as to coat the pores and crystal boundaries of each ferrite particle. In other words, the medium mixed with the laminating hardening agent enhances fusion between the agent and the ferrite surfaces during sintering to cause a chemically rigid bond therebetween.

Figure 2A:
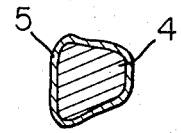
FIGS. 2A and 2B are magnified sectioned views of ferrite grains coated with a laminating hardening agent.
Figure 2B:
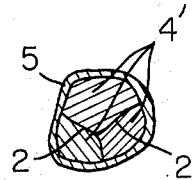

These hardened granular magnetic chips are obtained by crushing the magnetic material to any size (any grain diameter of about 30 to 300 microns) required for abrasives irrespective of the size of a single crystal grain of the magnetic material or, more particularly of the magnetic oxide material. Therefore, not only coated single crystal grains 4 of a ferrite as in FIG. 2A but also coated groups of a plurality of crystal grains 4' are included. In FIG. 2B, 2 is a crystal boundary, 4 and 4' are ferrite particles and 5 is a laminated film.

Further, the above mentioned granular magnetic chips are put into a well known granule separator or extruder. Some medium and laminating hardening agent or a mixture prepared by adding such highly magnetic filler as, for example, a fine granular ferrite, as a binder to the chips. The chips are then molded to be in the form of large grains, spheres or granules as in FIG. 3; or in the case of chips of a grain diameter less than about 2.6 mm. the chips can be compressed and molded into any forms (of a size of 3 to 75 mm.) such as of triangular, square, elliptic or diamond plates, disks, trigonal pyramids or cones, to obtain molded magnetic chips. They are then sintered to be hardened molded magnetic chips.

Figure 3:
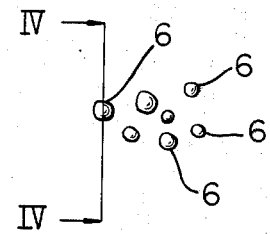
FIG. 3 shows spherically molded and sintered hardened magnetic chips.
Figure 4:
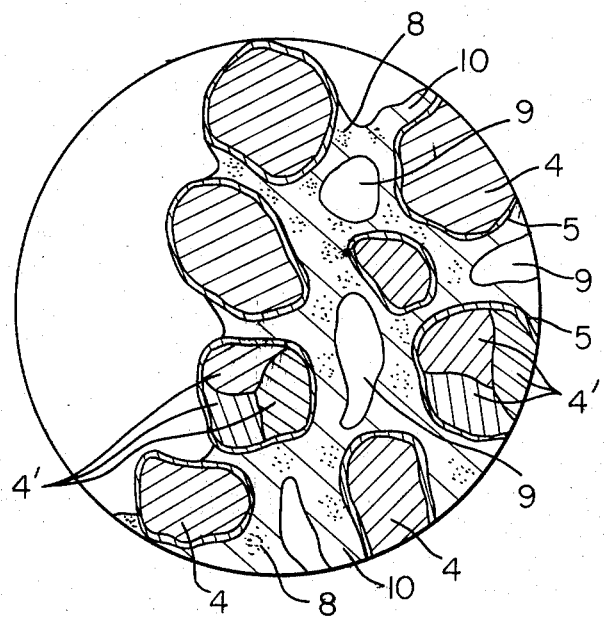
FIG. 4 is a magnified sectioned view of a part of the cross-section IV—IV in FIG. 3.

In order to elevate the abrasive activity and magnetism in the hardened chips, it is very effective to add some abrasive to the crushed fine powder grains or starting raw material composition of the magnetic material, to put it into the separator in molding them or to mix the highly magnetic filler into the laminating hardening agent as a binder. In FIG. 3, 6 is a hardened molded magnetic chip. FIG. 4 shows a cross sectional area of a hardened molded magnetic chip of FIG. 3. In said chip, abrasive grains are contained as required, and ferrite particles 4 and 4' together with said abrasive grains are coated with laminating films 5, the respective particles being connected with each other through a sintered bridge of a binder 10 containing a highly magnetic filler 8 and some voids 9.

It is needless to say that the magnetic materials utilized in the present invention include iron, nickel, cobalt and magnetic materials made by combining these elements. A magnetic oxide material such as a ferrite is more brittle than other magnetic materials. Therefore, the case of ferrites shall be explained particularly as an embodiment of the present invention. By processing the other magnetic materials in the same manner, the object of the present invention can be also attained. The process and materials used are as follows:

STEP 1

Granular magnetic chips were of the following mixing rates:

|  | Wt. percent |
|---|---|
| Magnetic oxide material | 75 |
| Medium | 15 |
| Laminating hardening agent | 10 |

The above mentioned magnetic oxide material consisted of 30 mol percent MnO, 15 mol percent ZnO and 55 mol percent $Fe_2O_3$. The medium used was an aqueous solution of copper nitrate consisting of 12 wt. percent Cu, 38 wt. percent $HNO_3$ and 50 wt. percent water. The laminating hardening agent to be used consisted of 40 wt. percent kaolin, 43 wt. percent clay, 10 wt. percent frit, 4 wt. percent lime and 3 wt. percent boric acid.

As a producing process, 75 wt. percent ferrite was crushed to be of a grain diameter of 30 to 300μ with a wet mill and was levigated and then dried and 15 wt. percent of the medium and 10 wt. percent of the laminating hardening agent were added to it while being stirred with a dry mill to obtain granular magnetic chip raw material.

STEP 2

The granular magnetic chip raw material produced in Step 1 was then sintered at 950° C. in an oxidizing atmosphere resulting in hardened granular magnetic chips. Their abrasive activity and wear-resistance are represented by straight lines A respectively in FIGS. 5 and 6.

Even when a powdery ferrite consisting of 5 mol percent NiO, 20 mol percent MgO, 5 mol percent CuO, 25 mol percent ZnO and 45 mol percent $Fe_2O_3$, a ferrite consisting of 20 mol percent CuO, 30 mol percent ZnO and 50 mol percent $Fe_2O_3$ and a ferrite consisting of 20 mol percent NiO, 30 mol percent ZnO and 50 mol percent $Fe_2O_3$ were respectively used in the above mentioned example, the same results could be obtained. In the present invention, an Mn-Zn series ferrite, Ni-Zn series ferrite, Ni-Cu-Zn series ferrite, Ni-Mg-Cu-Zn series ferrite and a mixture of one or more kinds of them are very effective.

The laminating hardening agent was formed of one or more kinds of kaolin, frit, lime and boric acid. The kinds and amounts in its formation were adjusted in accordance with the sintering or roasting temperature. For example, in case a sintering temperature of about 950° C. was required, the laminating hardening agent formed of 40% kaolin, 43% clay, 10% frit, 4% lime and 3% boric acid by weight showed a remarkable effect.

Other acceptable mixtures were formed with variations only in the formation of the laminating hardening agent. These are shown in Table 1.

TABLE 1
Unit in wt. percent

| Example numbers | 3 | 4 | 5 | 6 |
|---|---|---|---|---|
| Magnetic oxide material | 75 | 75 | 75 | 75 |
| Medium (copper nitrate's aqueous solution) | 15 | 15 | 15 | 15 |
| Kaolin | 4.5 | 5.0 | 5.5 | 10.0 |
| Clay | 5.0 | 4.8 | 4.5 | |
| Frit | 0.4 | 0.2 | | |
| Lime | 0.1 | | | |

The frits used in carrying out the present invention were chosen for their melting points, which were in the range of 950–1250° C. The following Tables 1A and 1B illustrate compositions of various frits classified according to melting point. As seen from the table, each of the frits having a melting point in the desired range is composed of $Al_2O_3$, $SiO_2$ (occasionally accompanied by $B_2O_3$), and certain substances selected from the alkaline group consisting of $NA_2O$, $K_2O$, CaO, ZnO, PbO and BaO. The "RO total" represents the total of alkaline substances.

The numbers in the following Tables 1A and 1B indicate parts by weight.

TABLE 1A

| | Melting points in SK number | | | | | |
|---|---|---|---|---|---|---|
| Composition | 08 (950° C.) | 06 (977° C.) | 04 (1,014° C.) | 02 (1,054° C.) | 01 (1,072° C.) | 2 (1,095° C.) |
| PbO | 0.88 | 0.48 | 0.51 | 0.70 | | |
| $Na_2O$ | 0.06 | | | | 0.32 | |
| $K_2O$ | 0.06 | 0.09 | 0.12 | 0.20 | 0.18 | 0.20 |
| ZnO | | | 0.07 | | | 0.4 |
| CaO | | 0.43 | 0.30 | 0.10 | 0.50 | 0.40 |
| RO total | 1.00 | 1.00 | 1.00 | 1.00 | 1.00 | 1.00 |
| $Al_2O_3$ | 0.10 | 0.17 | 0.12 | 0.25 | 0.52 | 0.22 |
| $SiO_2$ | 1.30 | 1.13 | 1.33 | 1.60 | 2.40 | 2.55 |

TABLE IB

| Composition Melting point | Melting points in SK number | | | | | | | |
|---|---|---|---|---|---|---|---|---|
| | 3 (1,120° C.) | 4 (1,134° C.) | 5 (1,156° C.) | 6 (1,176° C.) | 7 (1,186° C.) | 8 (1,200° C.) | 9 (1,227° C.) | 10 (1,250° C.) |
| $Na_2O$ | | 0.192 | 0.018 | | | | 0.30 | |
| $K_2O$ | | 0.064 | 0.185 | 0.25 | 1.10 | 0.30 | 0.30 | 0.30 |
| CaO | 0.30 | 0.494 | 0.396 | 0.30 | 0.20 | 0.60 | 0.40 | 0.60 |
| ZnO | | | 0.145 | | 0.20 | 0.10 | | 0.10 |
| PbO | 0.70 | 0.250 | 0.256 | | 0.50 | | | |
| BaO | | | | 0.45 | | | | |
| RO total | 1.00 | 1.000 | 1.000 | 1.00 | 1.00 | 1.00 | 1.00 | 1.00 |
| $Al_2O_3$ | 0.26 | 0.280 | 0.237 | 0.35 | 0.30 | 0.26 | 0.60 | 0.40 |
| $SiO_2$ | 1.78 | 2.810 | 2.484 | 2.00 | 2.00 | 2.90 | 4.00 | 3.80 |
| $B_2O_3$ | | 0.384 | 0.364 | | | | 0.40 | |

An acid denatured alumina consisting of A100H, HCl and $H_2O$ can be used as a medium instead of the aqueous solution of copper nitrate. When an aqueous solution of the acid denatured alumina was used as a medium, and when the sintering temperature was made 1000 to 1350° C., the action of the medium was highly acceptable, particularly effective in laminating and hardening a magnetic material having grain boundary surfaces or voids.

Mixing examples in which an acid denatured alumina was used as a medium are as shown in the following Table 2.

TABLE 2
Unit in wt. percent

| Example numbers | 7 | 8 | 9 | 10 | 11 |
|---|---|---|---|---|---|
| Magnetic oxide material | 75 | 75 | 75 | 75 | 75 |
| Acid denatured alumina | 15 | 15 | 15 | 15 | 15 |
| Kaolin | 4.0 | 4.5 | 5.0 | 5.5 | 10 |
| Clay | 4.3 | 5.0 | 4.8 | 4.5 | |
| Frit | 1.0 | 0.4 | 0.2 | | |
| Lime | 0.4 | 0.1 | | | |
| Boric acid | 0.3 | | | | |

TABLE 3

Example No. 12:
Ferrite _____ wt. percent __ 60
Copper nitrate _____ do ____ 20
Clay and kaolin _____ do ____ 20
Sintering temperature _____ ° C. __ 1250

Figure 5:
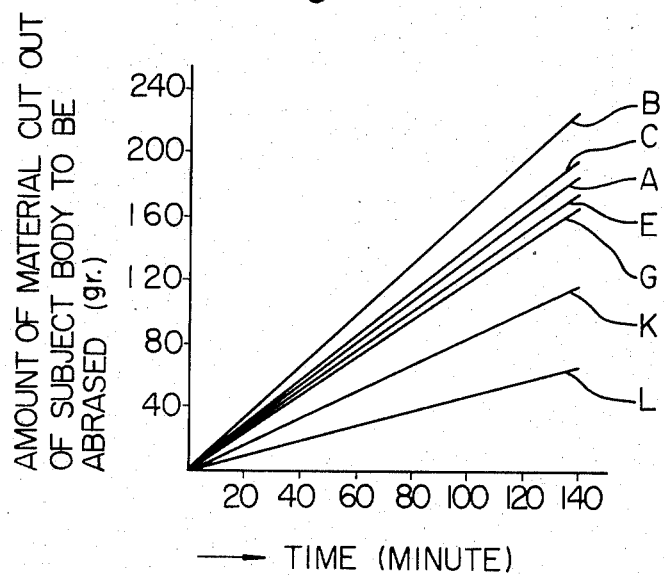
FIG. 5 shows abrasive activities of various kinds of barrel chips.
Figure 6:
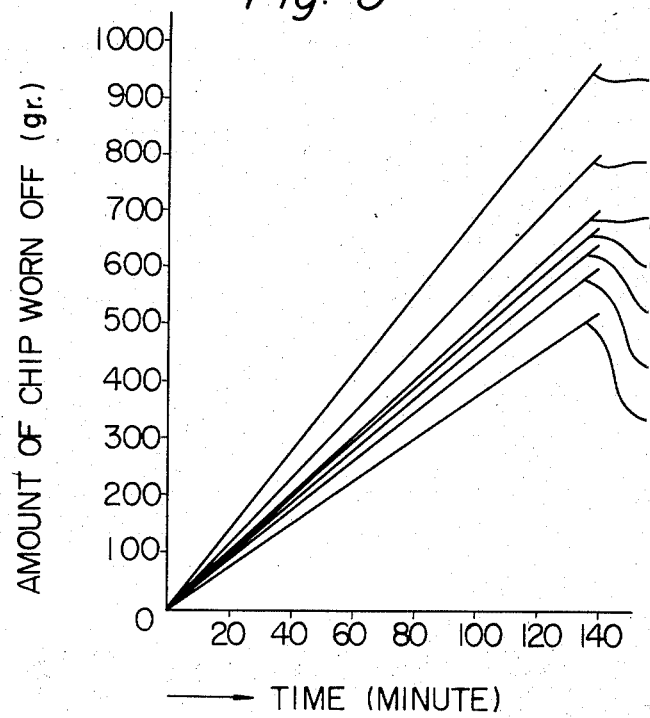
FIG. 6 shows wear-resistances of various kinds of barrel chips.

The abrasive activity and wear-resistance of the hardened granular magnetic chips in the Example 12 of Table 3 are represented by straight lines B respectively in FIGS. 5 and 6.

TABLE 4
Unit in wt. percent

| Example numbers | 13 | 14 | 15 |
|---|---|---|---|
| Ferrite | 56 | 60 | 60 |
| Abrasive | 4 | | 4 |
| Medium | 20 | 20 | 20 |
| Laminating hardening agent | 20 | 17 | 13 |
| Highly magnetic filler | | 3 | 3 |

In Examples 13 and 15 of the above Table 4, molten aluminum oxide was used as an abrasive. Further, silicon carbide, zircon or titanium oxide or a mixture of two or more of them can be used as an abrasive.

A fine powdery ferrite was used for a highly magnetic filler.

In the present invention, where water required for molding is in short supply any amount of carboxyl methyl cellulose can be added, and the molding will be favorable. In case a highly magnetic filler is to be added as in Examples 14 and 15, it should be put into only the inside of the binder to be a sintered bridge.

According to another embodiment of the present invention, abrasive chips having magnetism and abrasive activity can be made not only from an already made magnetic material such as the hardened granular chips described above but also from a starting raw material composition such as the magnetic ferrite itself. Starting raw material compositions for producing Mn-Zn series, Cu-Zn series, Ni-Zn series and Ni-Mg-Cu-Zn series ferrites similar to those described above are shown in the following Table 5. Also shown in the table are the direct mixtures of these ferrites with a medium and a laminating hardening agent to produce hardened magnetic chips.

TABLE 5
Unit in wt. percent

| Example numbers | 16 | 17 | 18 | 19 |
|---|---|---|---|---|
| Kind of hardened ferrite chips | (a) | (b) | (c) | (d) |
| Raw materials for producing ferrites: | | | | |
| CuO | 17 | | | 4.5 |
| ZnO | 25 | 13 | 25 | 2.0 |
| MnO | | 25 | | |
| NiO | | | 17 | 4.5 |
| MgO | | | | 17.0 |
| $Fe_2O_3$ | 43 | 47 | 43 | 38.0 |
| Abrasive grain | (4) | (4) | (4) | (4) |
| Medium | 3–10 | 3–10 | 3–10 | 3–10 |
| Laminating hardening agent | 8–15 | 8–15 | 8–15 | 8–15 |
| Total | 100–114 | 100–114 | 100–114 | 100–114 |
| Maximum temperature range of sintering or heating (° C.) | 950–1,050 | 1,250–1,350 | 1,200–1,250 | 1,150–1,210 | a Cu-Zn series. b Mn-Zn series. c Ni-Zn series. d Ni-Mg-Cu-Zn series.

The characteristics for chips made according to Examples 16 to 19 of the above Table 5 are represented respectively by straight lines D, E, F and G in FIGS. 5 and 6.

In actual practice, when 17 wt. percent CuO, 25 wt. percent ZnO, 43 wt. percent $Fe_2O_3$, 3 to 10 wt. percent of a medium and 8 to 15 wt. percent of a laminating hardening agent (with 4 wt. percent of abrasive grains added as required) were mixed, molded and sintered, hardened magnetic Cu-Zn series ferrite chips could be obtained. That is to say, $Fe_2O_3$ among the raw materials for producing ferrites solid-dissolved with another bivalent metal oxide to become a ferrite material, and at the same time the laminating hardening agent was strongly sintered with the medium on the surfaces of the crystal grains of the ferrite material and the abrasive grains and between the respective grains as shown in FIG. 4.

Mixing rate examples where a medium and a laminating hardening agent were added to granular magnetic chips and the chips were molded in a granule separator to produce molded magnetic chips, are as in the following Table 6. Further, in this case, an abrasive and a highly magnetic filler may be added.

TABLE 6
Unit in wt. percent

| Example numbers | 20 | 21 | 22 | 23 | 24 | 25 |
|---|---|---|---|---|---|---|
| Magnetic chips | 85 | 81 | 78 | 85 | 81 | 78 |
| Medium | 5 | 5 | 5 | 5 | 5 | 5 |
| Laminating hardening agent | 10 | 10 | 10 | 10 | 10 | 10 |
| Abrasive | | 4 | 4 | | 4 | 4 |
| Highly magnetic filler | | | 3 | | | 3 |

When the molded magnetic chips in the above mentioned Examples 20 to 25 were sintered at 950 to 1350° C., hardened molded magnetic chips could be obtained.

Further, when the granular magnetic chips and the molded magnetic chip material were mixed, were molded to be in any forms such as of triangular or square plates, ellipsoids, diamonds, disks or cones and were roasted and hardened, hardened molded magnetic chips could be obtained.

When hardened granular magnetic chips and a synthetic resinous binder were heated at 165 to 215° C., hardened magnetic resinous chips could be obtained. Synthetic resins such as phenolic, polyethylene or urea-formaldehyde resins have produced particularly desirable results. Further, hardened molded magnetic chips may be used instead of the above mentioned hardened granular magnetic chips. The hardened granular magnetic chips and hardened molded magnetic chips may be simultaneously used. In any case, a highly magnetic filler may be added which will additionally serve as an abrasive.

Mixing examples in such case are as in the following Tables 7 and 8.

TABLE 7
Unit in wt. percent

| Example numbers | 26 | 27 | 28 | 29 |
| --- | --- | --- | --- | --- |
| Granular hardened magnetic chips | 77 | 72 | | |
| Molded hardened magnetic chips | | | 77 | 72 |
| Highly magnetic filler | | 5 | | 5 |
| Resinous binder | 23 | 23 | 23 | 23 |

TABLE 8
Unit in wt. percent

| Example numbers | 30 | 31 |
| --- | --- | --- |
| Mixture of granular hardened magnetic chips and molded hardened magnetic chips | 77 | 72 |
| Highly magnetic filler | | 5 |
| Resinous binder | 23 | 23 |

The hardened ferrite which was the main ingredient of the hardened magnetic chips according to the present invention as in the above was hardened so uniformly that the minute Vicker's hardness values measured within the crystal grain, in the grain boundary and in the positions including voids were not different. The hardness difference between the measuring positions of a ferrite material not hardened according to the present invention was entirely eliminated therein. It was hardened so uniformly to the maximum intragranular hardness inherent to the ferrite that no impact cracks were produced. Thus the hardened magnetic chips were very reasonable as barrel-finishing chips.

Furthermore, each ferrite used in the present invention had a character such that the crystal hardness was all the more uniformly stabilized when it was repeatedly sintered. This made it possible to produce regenerated hardened magnetic chips by again finely crushing scrap chips after they had been used for barrel-finishing and making them a main ingredient for making additional new chips. However, in such case, the amounts of the added medium and laminating hardening agent had to be restricted to about 75% of those in the above described Example 1 and the heating temperature held to an intermediate temperature of about 1150° C.

A mixing example for such a case is as follows.

Example 32: Wt. percent
Granular hardened magnetic chips and molded hardened magnetic chips as crushed _____ 70
Medium _____ 15
Laminating hardening agent _____ 15

Further, in regenerating hardened resinous magnetic chips, when scrap chips (1) were roasted at about 300° C. to burn the resinous binder, (2) were water-washed and dried, (3) had then a resinous binder mixed in, (4) were molded and (5) were aged at a heating temperature of 165 to 215° C.; regenerated hardened resinous magnetic chips were obtained. However, these chips were somewhat lower in the magnetism.

Mixing examples for such cases were as follows:

Example 33: Wt. percent
Scrap magnetic chips as burned _____ 77
Resinous binder _____ 23

Example 34:
Hardened magnetic chips of grain diameters of 0.3 to 1.5 mm. produced in Examples 16 to 19 and used scraps or broken pieces of any other forms as crushed to be of 3.0 to 300

Wt. percent__ 72
Abrasive grains _____do____ 5
Resinous binder (phenol resin) _____do____ 23
Maximum heating temperature range, 160 to 215° C.

Their characteristics are represented by straight lines H in FIGS. 5 and 6.

We claim as our invention:

1. A process for producing magnetic chips in a granular state comprising the steps of:
   (a) mixing together a powdery ferrite, a medium selected from the group consisting of a copper nitrate aqueous solution and an acid denatured alumina consisting of AlOOH, HCl and H$_2$O, and at least one laminating hardening agent selected from the group consisting of clay, metal oxide frit, having a melting point of 950–1250° C., lime and boric acid, so as to coat said powdery ferrite with said laminating hardening agent through said medium; and
   (b) sintering said coated material at a temperature of 950–1250° C. so as to harden it.

2. Hardened magnetic chips in a granular state produced by the process of claim 1.

3. A process for producing magnetic chips in a granular state according to claim 1 further including the step of mixing an additional abrasive selected from the group consisting of aluminum oxide, silicon carbide, zirconium oxide, titanium oxide and mixtures of two or more thereof with said powdery ferrite, said medium and said laminating hardening agent before sintering.

4. A process as set forth in claim 1 wherein said powdery ferrite is selected from the group consisting of Cu-Zn series ferrites, Mn-Zn series ferrites, Ni-Zn series ferrites and Ni-Mg-Cu-Zn series ferrites.

5. A process for producing hardened molded magnetic chips comprising the steps of:
   (a) mixing a powdery ferrite, a medium selected from the group consisting of a copper nitrate aqueous solution and an acid denatured alumina consisting of AlOOH, HCl and H$_2$O, and at least one laminating hardening agent selected from the group consisting of clay, metal oxide frit having a melting point of 950–1250° C., lime and boric acid;
   (b) molding said mixture; and
   (c) sintering said molded mixture at a temperature of 950–1250° C.

6. A process for producing molded hardened magnetic chips comprising the steps of:
   (a) producing granular magnetic chips in accordance with the process recited in claim 1;
   (b) mixing said granular magnetic chips with a powdery ferrite, a medium selected from the group consisting of a copper nitrate aqueous solution and an acid denatured alumina consisting of AlOOH, HCl and H$_2$O, and at least one laminating hardening agent selected from the group consisting of clay, metal oxide frit having a melting point of 950–1250° C., lime and boric acid such that said powdery ferrites are coated with said laminating hardening agent through said medium;
   (c) molding said coated material and said chips; and
   (d) further sintering said mixture so as to harden it.

7. Hardened molded magnetic chips produced by the process of claim 6.

8. A process for producing resinous hardened magnetic chips comprising the steps of mixing granular hardened magnetic chips according to claim 1 with a synthetic resin selected from the group consisting of polyethylene, urea-formaldehyde and phenolic resins and heating the mixture at a temperature of 165–215° C.

9. A process for producing resinous hardened magnetic chips comprising the steps of mixing granular hardened magnetic chips produced by the process of claim 1 with an additional abrasive selected from the group consisting of aluminum oxide, silicon carbide, zirconium oxide, titanium oxide and mixtures of two or more thereof, molding said mixture with a synthetic resin selected from the group consisting of polyethylene, urea formaldehyde and phenolic resins and sintering said molded mixture at a temperature of 165–215° C. so as to effect hardening thereof.

References Cited

UNITED STATES PATENTS

| | | | |
|---|---|---|---|
| 2,947,124 | 8/1960 | Madigan et al. | 51—308 |
| 2,978,850 | 4/1961 | Gleszer | 51—308 |
| 3,071,456 | 1/1963 | Cheesman | 51—307 |
| 3,093,464 | 6/1963 | Coes | 51—309 |
| 3,450,515 | 6/1969 | Amero | 51—309 |
| 3,528,788 | 9/1970 | Seal | 51—309 |

DONALD J. ARNOLD, Primary Examiner

U.S. Cl. X.R.

51—308, 309

UNITED STATES PATENT OFFICE
CERTIFICATE OF CORRECTION

Patent No. 3,702,758          Dated November 14, 1972

Inventor(s) Sakae Fukui et al.

It is certified that error appears in the above-identified patent and that said Letters Patent are hereby corrected as shown below:

In the heading to the printed specification line 5, "assignors to" should read -- said Fukui assignor to --.

Signed and sealed this 8th day of January 1974.

(SEAL)
Attest:

EDWARD M. FLETCHER, JR.          RENE D. TEGTMEYER
Attesting Officer                 Acting Commissioner of Patents